United States Patent [19]
Englisch et al.

[11] Patent Number: 6,125,901
[45] Date of Patent: Oct. 3, 2000

[54] SEMIAUTOMATIC SYSTEM FOR MAKING DOORS

[75] Inventors: Hans-Joachim Englisch, Lippstadt; Carsten Henkenjohann, Gütersloh; Klaus Rüdiger Lampe, Bielefeld; Thomas Lücking, Büren; Ali Mansuroglu, Wadersloh; Wolfgang Melies, Rietberg; Hubertus Ritzenhofen, Hüllhorst, all of Germany

[73] Assignee: WM Wild Maschinen GmbH, Reitberg, Germany

[21] Appl. No.: 09/028,531

[22] Filed: Feb. 24, 1998

[30] Foreign Application Priority Data

Feb. 24, 1997 [DE] Germany ............................ 197 07 293

[51] Int. Cl.[7] .......................... B30B 12/00; B32B 31/00; E06B 5/00
[52] U.S. Cl. .......................... 156/362; 156/517; 156/559; 156/566; 156/580; 156/583.1; 269/905; 52/784.1
[58] Field of Search ..................... 156/517, 559, 156/570, 583.1, 362, 566, 580; 269/905; 52/784.1; 16/402

[56] References Cited

U.S. PATENT DOCUMENTS

| | | | |
|---|---|---|---|
| 3,731,444 | 5/1973 | Tobin | 52/316 |
| 3,899,860 | 8/1975 | Newell | 52/313 |
| 5,285,608 | 2/1994 | Costello | 52/456 |

*Primary Examiner*—Linda L. Gray
*Attorney, Agent, or Firm*—Herbert Dubno; Andrew Wilford

[57] ABSTRACT

A door is made from a rigid core plate, two side bars, two end bars, a pair of face panels, and a pair of cover sheets. The core plate and bars are cut to respective sizes, and then the bars are manually fitted around the core plate, are pressed against edges of the core plate to form a door core, and are secured together at corners of the core. This core is displaced on an upstream core conveyor to a core-holding station. One of the face panels is loaded manually onto a face-panel conveyor and fed thereby through a glue applicator to a face-panel holding station and one of the cover sheets is manually set in a cover-sheet holding station. The one cover sheet is picked up and laid in a stacking station, then the one face panel is picked up and set atop the one cover sheet, and then the core is picked up and set atop the face panel. The other face panel is manually loaded onto the face-panel conveyor and is fed thereby through the glue applicator to the face-panel holding station and the other cover sheet is manually set in the cover-sheet holding station. Then the other face panel is picked up and laid in the stacking station atop the core plate and the other cover sheet is picked up and laid atop the other face panel. Finally the stack in the transfer station is transferred into a press.

10 Claims, 5 Drawing Sheets

SEMIAUTOMATIC SYSTEM FOR MAKING DOORS

FIELD OF THE INVENTION

The present invention relates to the manufacture of doors. More particularly this invention concerns the semiautomatic manufacture of multicomponent doors.

BACKGROUND OF THE INVENTION

A standard door is formed by a core plate, an annular frame formed by side and end members surrounding the core plate, a pair of face panels secured to opposite faces of the core formed by the core plate and frame, and decor sheets covering outside faces of the face panels. The core can be made of plywood, chipboard, a rigid gridwork of wooden or paper elements, or the like. The frame is typically made of rectangular-section wooden elements that allow the door to be trimmed, fitted, and mounted using conventional tools and fasteners. The panels are typically pressed board, thin plywood, or another material having high impact resistance. The cover sheets can be wood veneer in a high-quality door or a plastic laminate for a more durable and inexpensive door.

Although it is known to make such doors in a wholly automatic operation, the equipment is so large and complex that it can normally only produce doors of a few different sizes. Changeover from one door size to another is an extremely difficult and time-consuming task so that such an installation is normally devoted to a single standard-size door.

On the other hand production of doors with off sizes or particular characteristics is normally done in a wholly manual system. Thus the various parts are put together by hand and fed manually to a final press where they are all assembled together. Thus such doors are fairly expensive, especially as compared to the low cost of the doors made wholly automatically.

OBJECTS OF THE INVENTION

It is therefore an object of the present invention to provide an improved system for making doors.

Another object is the provision of such an improved system for making doors which overcomes the above-given disadvantages, that is which is relatively efficient but that allows off-size or specialty doors to be made at low cost.

SUMMARY OF THE INVENTION

A door is made according to the invention from a rigid core plate, two side bars, two end bars, a pair of face panels, and a pair of cover sheets. First the core plate and bars are cut to respective desired sizes, and then the bars are manually fitted as a frame around the core plate, are pressed against edges of the core plate with a clamping machine to form a door core, and are secured together at corners of the core. This core is displaced on an upstream core conveyor to a core-holding station. One of the face panels is loaded manually onto a face-panel conveyor and is fed thereby through a glue applicator to a face-panel holding station and one of the cover sheets is manually set in a cover-sheet holding station. First the one cover sheet is picked up and laid in a stacking station by a stacking machine, then the one face panel is picked up and set atop the one cover sheet, and then the core is picked up and set atop the face panel. The other face panel is manually loaded onto the face-panel conveyor and is fed thereby through the glue applicator to the face-panel holding station and the other cover sheet is manually set in the cover-sheet holding station. Then the other face panel is picked up and laid in the stacking station atop the core plate and the other cover sheet is picked up and laid atop the other face panel by the stacking machine. Finally the stack in the transfer station is transferred into a press and pressed.

According to the invention the appropriate steps are repeated to produce a second stack that is transferred simultaneously with the first-mentioned stack into the press and both stacks are pressed simultaneously. To this end the stacks are displaced into the press by means of a rack. The stacks are also unloaded from the press with the rack. The stacks can be transported back to the transfer station.

The face panel can be cleaned before being coated, normally on both faces, with glue. In addition the core is normally centered on the conveyor in the core-holding station.

The apparatus in accordance with the invention has respective supplies of the bars and the core plates adjacent a work station having a sizing table and immediately there adjacent an assembly table. A transversely effective saw, guides for the bars, and a pusher for moving a core plate and bars into position at the saw cut the moved core plate and bars to size and displace the cut core plate and bars to the assembly table. Raisable and lowerable stops and transversely and longitudinally displaceable clamping elements at the assembly table assemble a door core from the cut door plate and bars. A conveyor transports the core to a core-holding station. A supply of the face panels is separated from a face-panel holding station by a glue applicator and a face-panel conveyor can feed one of the face panels through the glue applicator to the face-panel holding station. A supply of the cover sheets is positioned adjacent a cover-sheet holding station. A stacking machine picks up and lays in a stacking station first the one cover sheet, then the one face panel atop the one cover sheet, and then the core atop the face panel. The other face panel is then loaded onto the face-panel conveyor and is fed thereby through the glue applicator to the face-panel holding station. The other cover sheet is manually set in the cover-sheet holding station where the stacking machine can pick up and lay in the stacking station the other face panel atop the core plate and the other cover sheet atop the other face panel. A press is provided adjacent the stacking station and a conveyor transfers the stack in the transfer station into the press and presses the stack.

The means for displacing the cut core plate and bars to the assembly table includes at least one conveyor belt extending from the sizing table to the assembly table. In addition means is provided for raising the conveyor belt above and dropping it below an upper surface of the sizing and assembly tables.

A sensor is provided at the work station for controlling advance of the pusher and the guides are provided with adjustable stops so that length of the bars can be controlled.

The means for displacing the cut core plate to the assembly table includes raisable and lowerable stops movable from the sizing table toward the assembly table. The clamping elements includes these stops and a pair of transversely movable clamping bars at least one of which is transversely movable, the term "transverse" meaning crosswise or perpendicular to the direction of travel and "longitudinal" parallel thereto.

The face-panel supply, the face-panel holding station, and the glue applicator are arranged in a straight line extending parallel to a direction of movement of the core conveyor means. Means can be provided for cleaning the face panels between the face-panel supply and the glue applicator.

The stacking machine is of the portal type and extends over the stacking station, cover-sheet supply, cover-sheet holding station, and face-panel holding station. The conveyor for transferring the stack into the press includes a rack having two levels for holding such stacks and two levels for holding two finished doors. The press has two levels.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
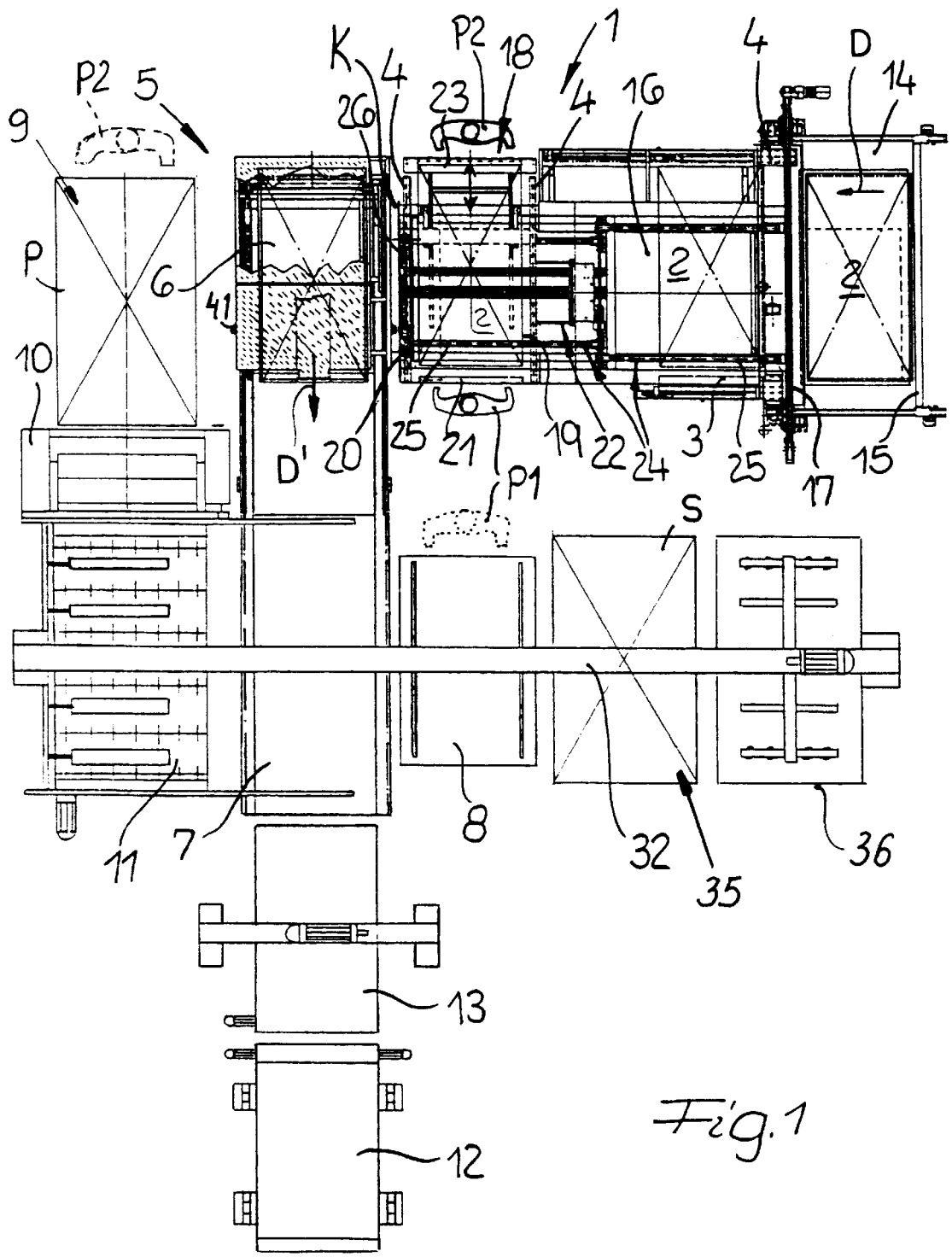
FIG. 1 is a small-scale partly schematic top view of a door-making system according to the invention.
Figure 2:
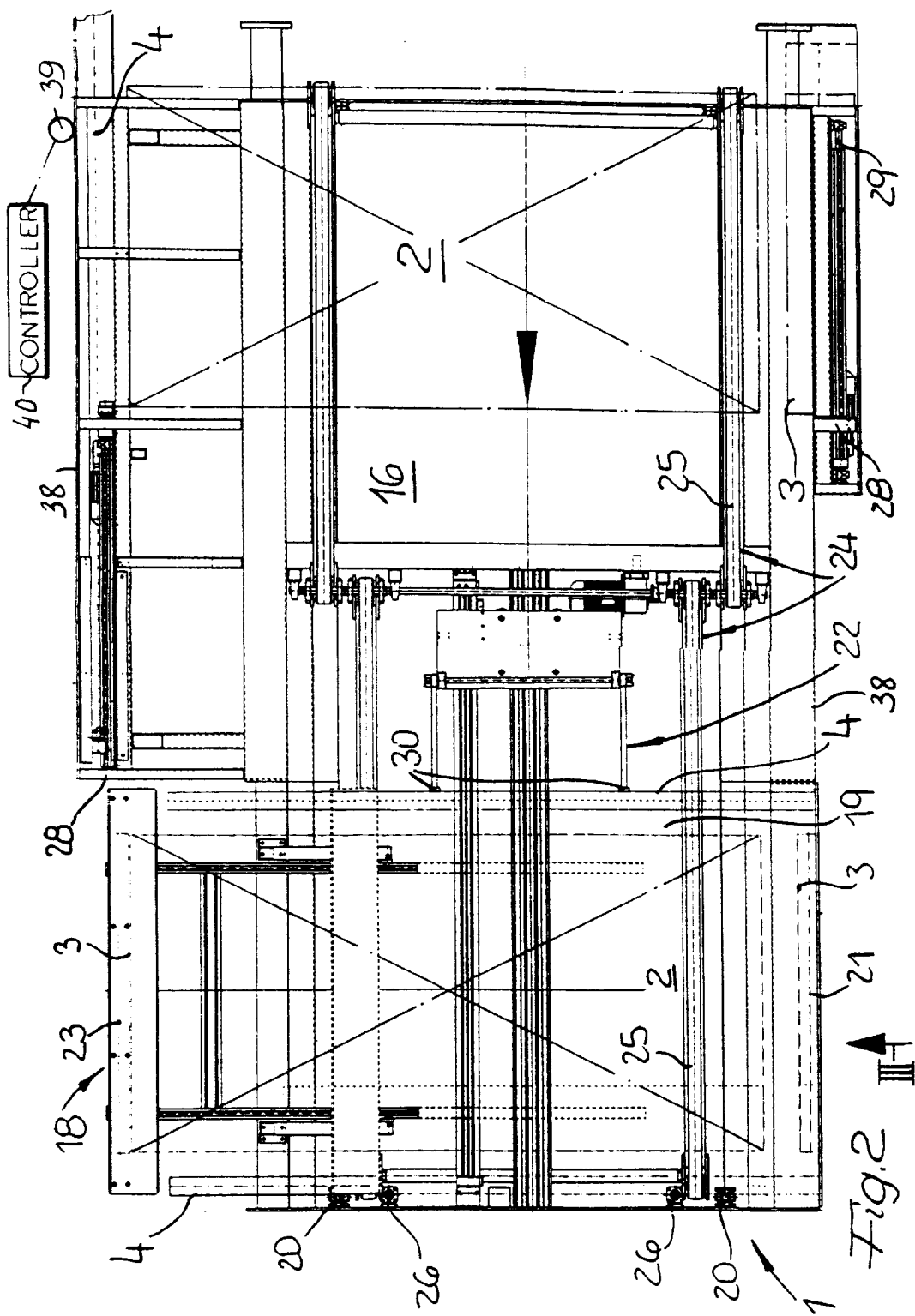
FIG. 2 is a larger-scale view of a detail of FIG. 1.
Figure 3:
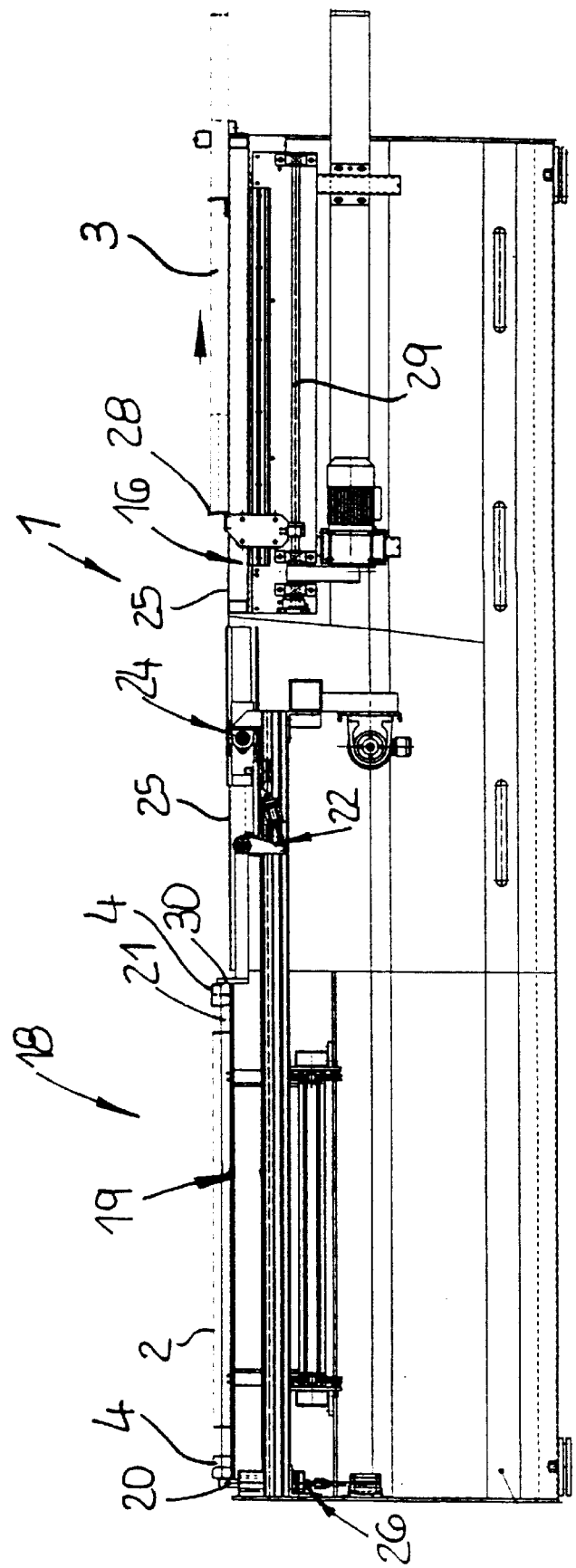
FIG. 3 is a side view taken in the direction of arrow III of FIG. 2.

As seen in FIGS. 1 through 3 the system of this invention has an assembly station 1 where a core plate 2 is fitted with a frame comprising end members or bars 3 and side members or bars 4 to form a core K. A holding station 5 for the core K has a conveyor 6 for delivering the cores K to a stacking station or table 7 having on one side a station 8 for orienting cover sheets S taken from a supply 35. Face panels P are fed from another supply 9 through a glue-coater 10 to the holding station 5 from which the panels P are fed to the table 7 whence the completed sandwich is fed by a conveyor 13 to a multilevel press 12 and subsequently removed therefrom by the same conveyor 13. The device 13 for loading and emptying the press 12 has a vertically displaceable rack with two levels for loading and two levels for removing finished doors and is provided between the press 12 and the table 7.

The station 1 for making the core K has a supply 14 for core plates 2, a slider 15 for advancing a core plate 2 to a sizing table 16 adjacent the supply table 14, a transversely displaceable saw 17 positioned in an advance direction D between the sizing table 16 and the supply table 14, and a frame-assembly station 18. The frame-assembly station 18 has a frame-assembly or work table 19 provided at its downstream edge with a transverse abutment 20 raisable up above the plane of the table 19, a lateral frame bar 21, a longitudinal pusher 22 effective in the transport direction D, and a transverse slider 23 across from the frame bar 21.

Guides 38 are provided on the sides of the holding table 16 for feeding in lengths of material from which the end bars 3 and side bars 4 can be cut with the lengths of the fed-in stock reaching across the path of the saw 17. The work station 1 for making the core K, the conveyor 6 for moving along the core K, the table 7, and the table 8 are U-shaped with the table 19 of the frame-assembly station 18 and the cover-sheet table 8 forming a work space for a service person or worker P1.

The tables 16 and 19 of the frame-assembly station have a conveyor 24 with continuous conveyor belts 25 that extend from an upstream end at the saw 17 to the downstream transverse abutment 20. The core plates 2 moved by the pusher 15 of the supply table 14 onto the table 16 lie on these belts 25 and are moved thereby downstream to engage the abutment 20. Lifters 26 are provided for raising and lowering the conveyor 24 so that once the core plate 2 is in position the belts 25 can be lowered below the plane of the table 19.

The station 1 has a sensor 39 that detects the advance of the plate 2 taken off the supply table 14 and that is connected with a controller 40 which stops the advance of the core plate 2 by the conveyor 24 when the plate 2 reaches a predetermined position. The guides 38 for the stock forming the transverse and longitudinal beams 3 and 4 have abutments 28 whose spacing from the transverse path of the saw 17 is set by adjustment spindles 29 that are controlled according to the invention by an electric motor operated by the controller 40. This allows the core plates 2 and the necessary bars 3 and 4 to be positioned at the saw 17 and cut to the desired sizes. The plate conveyor 24 moves the cut core plate 2 to the frame-assembly station 18 to one side of which is the operator P1 and to the other side of which is another operator P2. The two operators P1 and P2 together set the bars 3 and 4 in place to form the necessary frame around the plate 2. Then the core K formed by the plate 2, two bars 3, and two bars 4 is pressed together and the ends of the bars 3 and 4 are fastened together, normally by means of staples.

The frame-assembly station 18 is best seen in FIGS. 2 and 3. Its longitudinal pusher 22 has upright pusher elements 30 that are dropped below the plane of the table 19 as the core plate 2 is moved into the station 18. Once the elements 30 are raised the pusher 22 first presses the bars 4 against the core plate 2. When the abutment 20 is dropped the pusher 22 can advance farther into the frame-assembly station 18 to move the finished core K to the conveyor 6.

The top view of FIG. 1 shows that the supply 9 for the face panels P forms with the glue applicator 10 and the table 11 a straight production line that extends parallel to the conveyor 6 for the cores K. Thus the core pieces are moved together in direction D until they reach the conveyor 6, then move at a right angle thereto in direction D' to go to the press 12, with the core K having its long dimension crosswise to the direction D and parallel to the direction D'. The conveyor 9 and the externally accessible parts of the table 9 of the frame-assembly station form a place for the second operator or worker P2.

Figure 5:
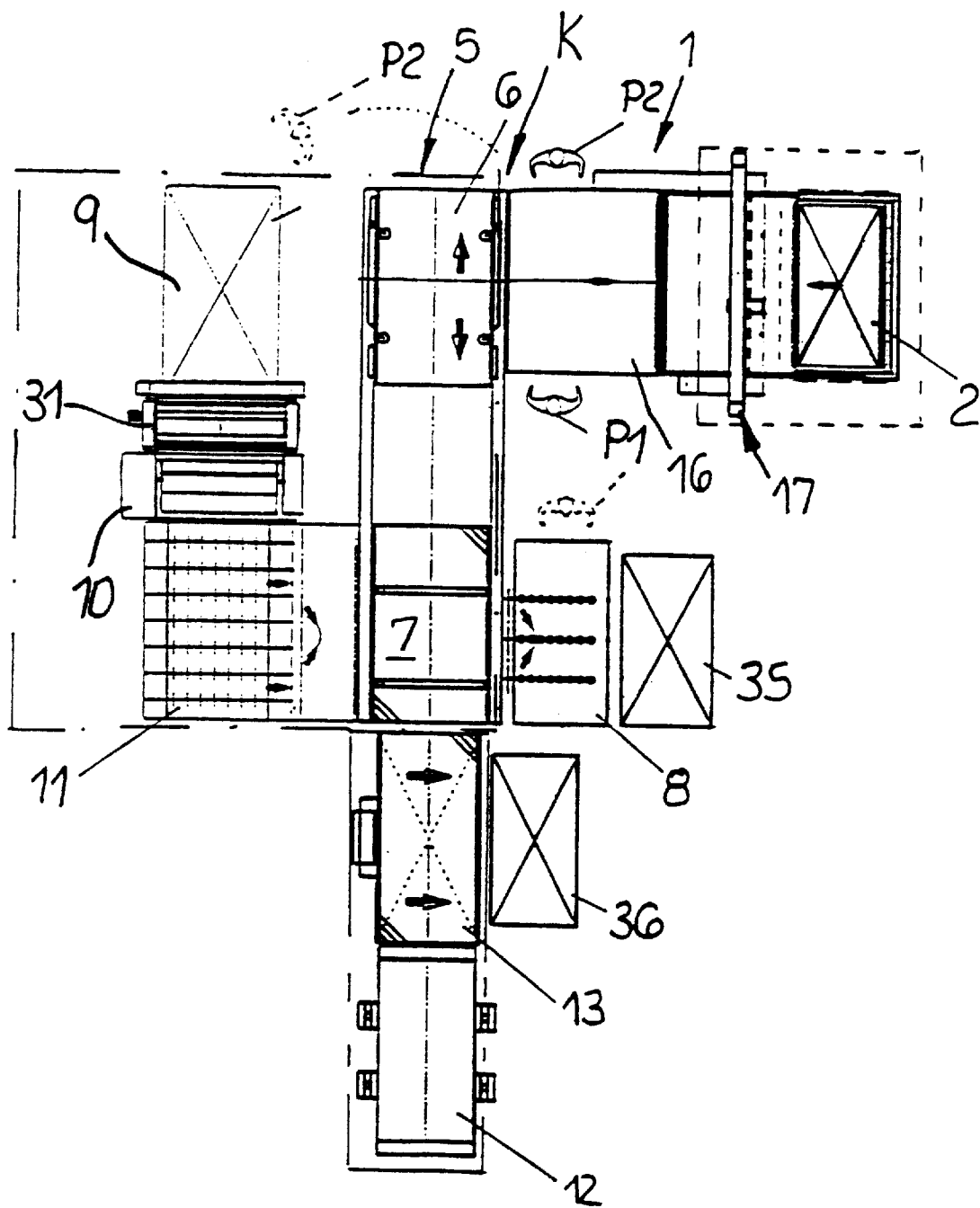

The glue applicator 10 can be provided with a cleaning device 31 as shown only in FIG. 5. In addition a portal-type stacker 32 is provided which extends across the supply 35, the table 7, and the table 8.

Figure 4:
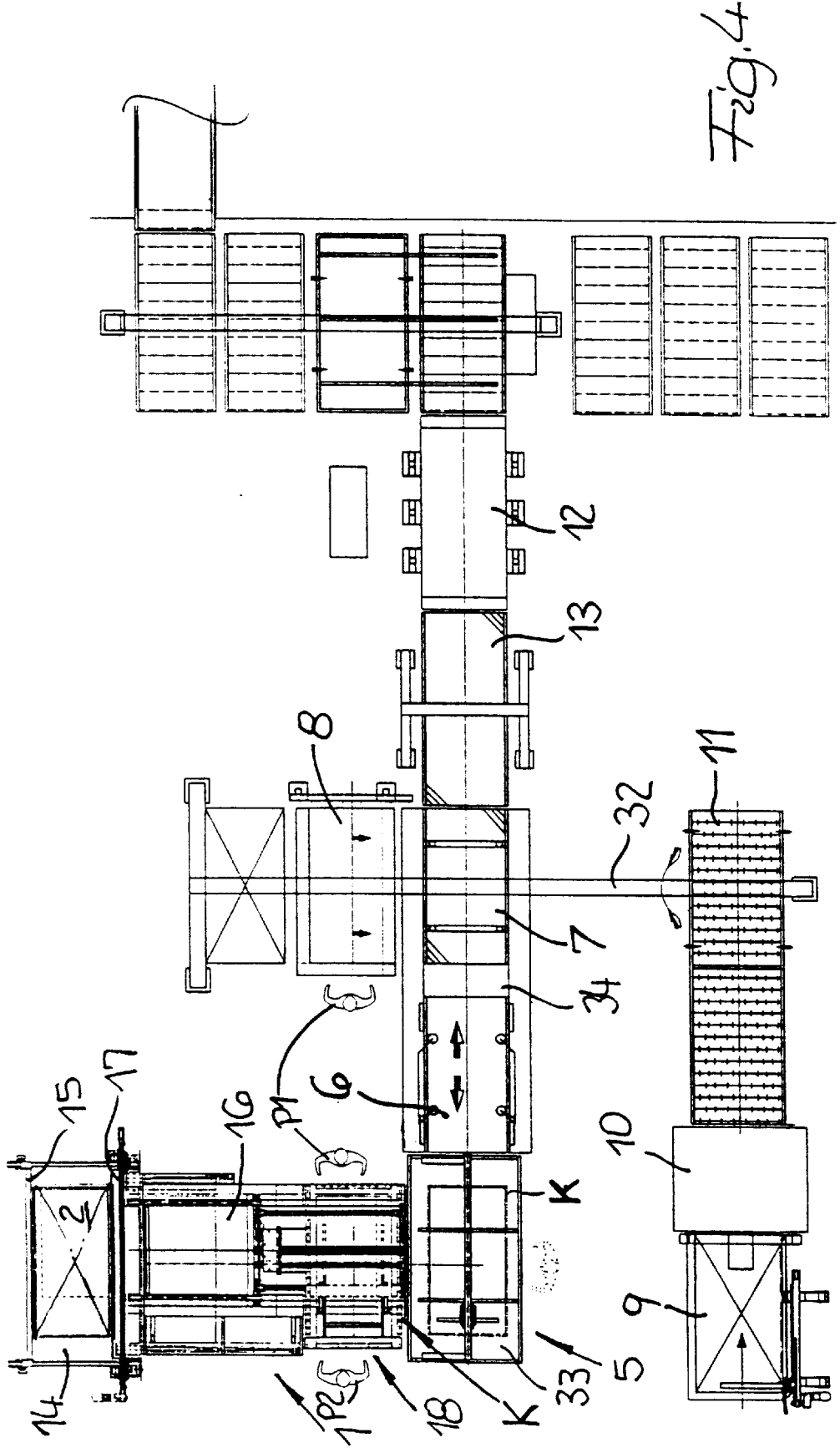
FIGS. 4 and 5 are views like FIG. 1 of alternative systems in accordance with the invention.

In the system of FIG. 1 the door cores K are moved by the pusher 22 directly onto a transport carriage of the conveyor 6 where they are centered by raised stops 41. In the arrangement of FIG. 4 the transfer of the door cores K takes place first via an intermediate table 33 from which the door cores K are each moved further by a carriage of the conveyor 6. In addition an intermediate part 34 is provided in the path of the conveyor to serve as a place holder that can be replaced by a roll of layering paper.

The system described above operates as follows:

The supply table 14 holds core plates 2 of predetermined length, any desired width, and predetermined thickness, the width normally being determined by the maximum width of the door to be produced. The pusher 15 moves the top core plate 2 to the saw 17 which moves across to establish the desired door width. At the same time the saw 17 cuts the bars 3 and 4 to the necessary lengths as determined by the positions of the stops 28. In the region downstream of the saw 17 are the two workers P1 and P2. Here there is already a cut core plate 2 as well as sawn side and end bars 3 and 4. The worker P1 hands one end bar 3 to the worker P2 since the end bars 3 are on the side of the worker P1. The worker P1 sets in place one or if necessary two end bars. The person P2 sets in position one side bar 4 and the end bar 3 handed over by the worker P1 at the downstream side of the core plate 2.

The conveyor 24 moves the cut core plate 2 to the frame-assembly station which has a frame press constituted by the transverse and longitudinal pushers 23 and 22. The longitudinal pusher 22 is drawn back about 10 cm from the edge of the plate 2 so that the second side bar can be set in place. Then the parts 2, 3, and 4 are all pressed together and are connected at the corners.

The longitudinal pusher 22 moves the core K into the holding station 5 after the abutment 20 is moved out of the way and the above-described steps are repeated by the workers P1 and P2. Then the worker P2 moves as shown in dashed lines to the supply 9 and pushes a face panel P through the glue applicator 10.

Meanwhile the worker P1 takes from the stack 35 a cover sheet S and positions it centrally on the table 8 on one edge so that tears and other flaws in its grain can be eliminated by orienting this sheet. More particularly since the cover sheet S is much wider than necessary it is possible to eliminate common edges or corner flaws by ensuring that they hang over edge of the table 8. The cover sheet S is laid good face downward on the table 7.

The portal stacker 32 picks up the cover sheet S from above and lays it on the table 7. The face panel P from the table 11 is then lifted and turned over, through 180°, and laid on this cover sheet S. Thus two layers of the door sit on the table 9, namely one cover sheet S and one face panel P.

The door core K sitting on the carriage 6 is centered as described above thereon by the stops 41. The carriage 6 then moves adjacent the table 7 and unillustrated edge clamps engage the core K and lay it on the two-part stack on this table 7. Meanwhile the worker P2 pushes another face panel P through the glue applicator 10 while the worker P1 sets another cover sheet S on the table 8, this time orienting the good face of the cover sheet so it is directed upward. This time the face panel P is not, however, inverted after being coated with glue but is slid over atop the three-layer stack on the table 7 by the stacker 32. To this end the table 7 also has an unillustrated centering system and a pivotal pusher that pushes the second face panel P from the conveyor carriage as it moves back from above the table 7. This leaves four layers on the table 7.

Then the portal stacker 32 picks up the second cover sheet from the table 8 and lays it on the stack on the table 7, producing the desired five-layer stack. The finished stack is moved by a roller conveyor into the lower level of the rack 13. Another such stack is then prepared as described above and rolled into the upper level of the rack 13. Both such stacks are then transferred to the press 12 where they are compressed and heated to solidly bond together all the layers. During the pressing two more five-layer stacks can be formed. Once the pressing is done the finished doors are slid on rollers into the two lower levels of the rack 13. The portal stacker 32 then loads the finished doors into a stack 36 (FIG. 5).

The system of FIG. 5 has no portal stacker. Here the cover-sheet table 8 has a suction system that can turn over the sheets S by engaging them suctionally from below and inverting them through 180° as it deposits them on the table 7. The rack 13 has two levels for loading the press 12 and two more for unloading it. In addition it has an addition pusher for forming stacks as shown by arrows. A pipe rack is used to receive the stack 36.

The provision of an apparatus for turning over the sheets in station 11 has the advantage that the treatment of the face panels is easier to control. The masonite face panels normally have a smooth good side that is turned outward so the panels need to be provided with less adhesive on this side as on their opposite rougher side. It is thus possible to have a different adhesive or an adhesive coating of different thickness or consistency on one face of the face panel as on the other, and in some situations applying glue on both sides is not necessary.

We claim:

1. An apparatus for making a door from a rigid core plate, two side bars, two end bars, a pair of face panels, and a pair of cover sheets, the apparatus comprising:

respective supplies of the bars and the core plate adjacent a work station having a sizing table and immediately there adjacent an assembly table;

a transversely effective saw;

means including a guide for the bars and a pusher for moving the core plate and bars from the respective supplies into position at the saw, cutting the moved core plate and bars to size, and displacing the cut core plate and bars to the assembly table;

means including raisable and lowerable stops and transversely and longitudinally displacable clamping elements at the assembly table for assembling a door core from the cut plate and bars;

conveyor means for transporting the door core to a core-holding station;

a supply of the face panels;

a face-panel holding station;

a glue applicator between the face-panel supply and the face-panel holding station;

first transport means including a face-panel conveyor for feeding one of the face panels through the glue applicator to the face-panel holding station;

a supply of the cover sheets;

a cover-sheet holding station;

second transport means including a stacking machine for picking up and laying in a stacking station one of the cover sheets from the cover-sheet holding station, then the one face panel from the face-panel holding station atop the one cover sheet, and then the door core atop the one face panel, the first transport means further serving to feed the other face panel through the glue applicator to the face-panel holding station;

the second transport means further serving for picking up and laying in the stacking station the other face panel from the face-panel holding station atop the door core and the other cover sheet from the cover-sheet holding station atop the other face panel to form a stack in the stacking station;

a press adjacent the stacking station; and conveyor means for transferring the stack in the stacking station into the press and pressing the stack to form the door.

2. The door-making apparatus defined in claim 1 wherein the means including the guide and pusher further includes at least one conveyor belt extending from the sizing table to the assembly table.

3. The door-making apparatus defined in claims 2, further comprising
   means for raising the conveyor belt above and dropping it below an upper surface of the sizing and assembly tables.

4. The door-making apparatus defined in claim 1, further comprising
   means including a sensor at the work station for controlling advance of the pusher.

5. The door-making apparatus defined in claim 1 wherein the guide is provided with adjustable stops, whereby length of the bars can be controlled.

6. The door-making apparatus defined in claim 1 wherein the stops are movable from the sizing table toward the assembly table and the clamping elements include a pair of clamping bars at least one of which is transversely movable.

7. The door-making apparatus defined in claim 1 wherein the face-panel supply, the face-panel holding station, and the glue applicator are arranged in a straight line extending parallel to a direction of movement of the core conveyor means.

8. The door-making apparatus defined in claim 1, further comprising
   means for cleaning the face panels between the face-panel supply and the glue applicator.

9. The door-making apparatus defined in claim 1 wherein the stacking machine is a portal extending over the stacking station, cover-sheet supply, cover-sheet holding station, and face-panel holding station.

10. The door-making apparatus defined in claim 1 wherein the conveyor means for transferring the stack into the press includes a rack having two levels for holding such stacks and two levels for holding two doors.

* * * * *